United States Patent [19]

Iwanade

[11] 4,446,526
[45] May 1, 1984

[54] CONTROL CIRCUIT FOR ZOOMING DEVICE

[75] Inventor: Hisao Iwanade, Saitama, Japan

[73] Assignee: Asahi Kogaku Kogyo Kabushiki Kaisha, Tokyo, Japan

[21] Appl. No.: 279,646

[22] Filed: Jul. 2, 1981

[51] Int. Cl.³ .............................................. G02B 7/11
[52] U.S. Cl. .................................. 364/525; 358/225; 350/429; 352/140
[58] Field of Search ................ 364/525; 358/225, 227; 350/429; 352/139–142

[56] References Cited

U.S. PATENT DOCUMENTS

| | | | |
|---|---|---|---|
| 4,043,642 | 8/1977 | Hirose et al. | 350/429 |
| 4,161,756 | 7/1979 | Thomas | 350/429 |
| 4,198,129 | 4/1980 | Vockenhuber | 350/429 |
| 4,329,029 | 5/1982 | Haskell | 364/525 |

Primary Examiner—Gary Chin
Attorney, Agent, or Firm—Sughrue, Mion, Zinn, Macpeak & Seas

[57] ABSTRACT

A compact control circuit for a zoom lens assembly including a microcomputer and external devices including a pulse motor driver section, a detection section, and an operation section coupled through an interface circuit to the microcomputer. The external devices supply a start signal, a magnification specifying signal, an origin position signal and a clock signal to the microcomputer. In response to the signals from the external devices, the microcomputer advances through predetermined programming steps to apply an acceleration/deceleration signal, a forward/reverse rotation signal and a gating signal to the external devices to cause a pulse motor therein to move the zoom lens assembly to a selected magnification position.

4 Claims, 3 Drawing Figures

CONTROL CIRCUIT FOR ZOOMING DEVICE

BACKGROUND OF THE INVENTION

The invention relates to a control circuit for a zooming device, in which processes for moving a group of zoom lenses (hereinafter referred to as "a zoom lens assembly" when applicable) to a desired one of a number of magnificaton positions (200 for instance) are controlled by a microcomputer.

A conventional processing circuit of this type is assembled from TTL or CMOS logic circuits. The physical size of such a processing circuit for moving a zoom lens assembly to a number of (for instance, more than 200) magnification positions is ordinarily large, and it is considerably difficult to simply increase or change the functions thereof.

Due to recent developments in semiconductor manufacturing techniques, microcomputers capable of performing calculations or other operations with one or several chips have become available. With the processing circuit being constituted with such a microcomputer with suitable software provided, the circuit can be easily miniaturized and the functions thereof can be readily increased or changed.

SUMMARY OF THE INVENTION

Overcoming the drawbacks of the prior art, the invention provides a control circuit for a zooming device including a microcomputer, a plurality of external devices, and an interface circuit for transferring signals between the microcomputer and the external devices. The external devices include a pulse motor driver section, a detecting section and an operating section. The external devices supply a start signal, a magnification specifying signal, an origin position signal and a clock signal to the microcomputer. In response to the signals from the external devices, the microcomputer advances through predetermined program steps to apply an acceleration/deceleration signal, a forward/reverse rotation direction signal and a gating signal to the external device thereby to cause a pulse motor to move a zoom lens assembly to a selected magnification position.

DESCRIPTION OF THE PREFERRED EMBODIMENTS

Figure 1:
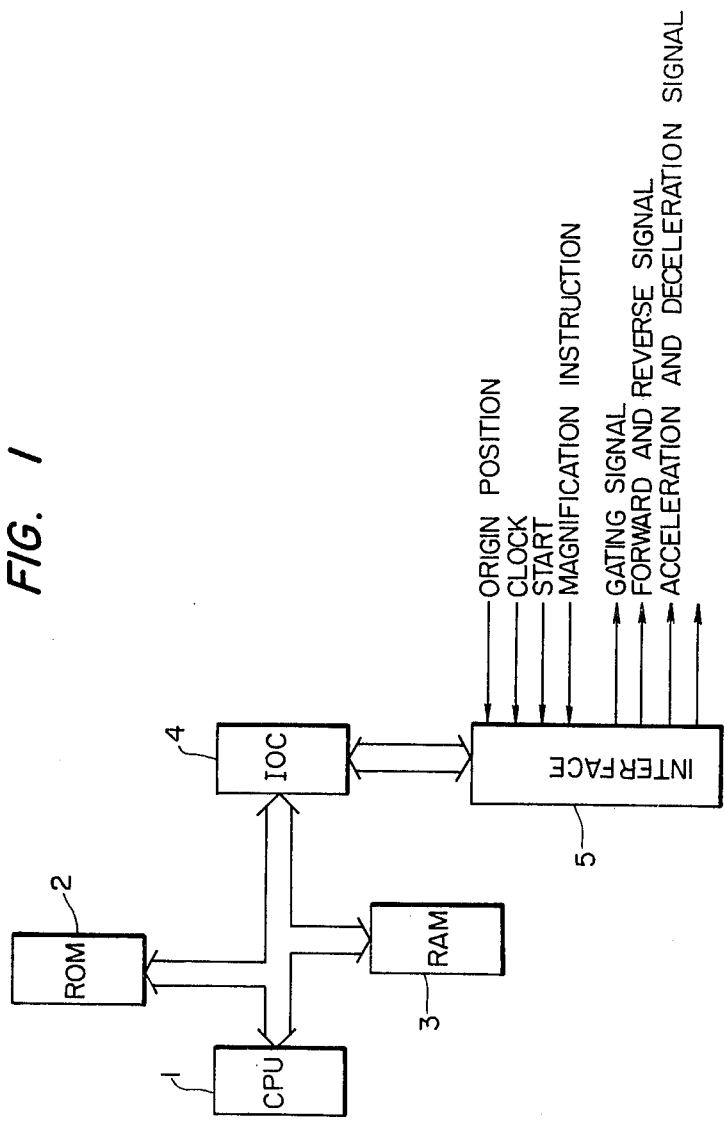
FIG. 1 is a block diagram showing a zooming device control circuit according to the invention.

FIG. 1 shows a basic arrangement of a microcomputer system. A central processing unit 1 successively reads program data stored in a ROM (read-only memory) 2 and carries out data operations while performing predetermined sequence processes thus carrying out required input and output controls. During the operation of the CPU 1, necessary data is transferred between the central processing unit 1 and external devices through an input and output control section 4 and an interface circuit 5. With the invention, the external devices are a pulse motor driver section, a detecting section, an operating section, and related components. A start signal, a magnification specifying signal, an origin position signal, and a clock signal are applied from these external devices through the interface circuit 5 to the central processing unit 1. In response to these input signals, the central processing unit 1 applies a gating signal, an acceleration/deceleration signal, and a forward/reverse rotation signal, as control signals, to the external devices.

A RAM (random access memory) 3 stores data and flags used by the central processing unit 1. As the programs or data stored in the ROM 2 can be readily rewritten, various additions or modifications thereto can easily be achieved.

Figure 2:
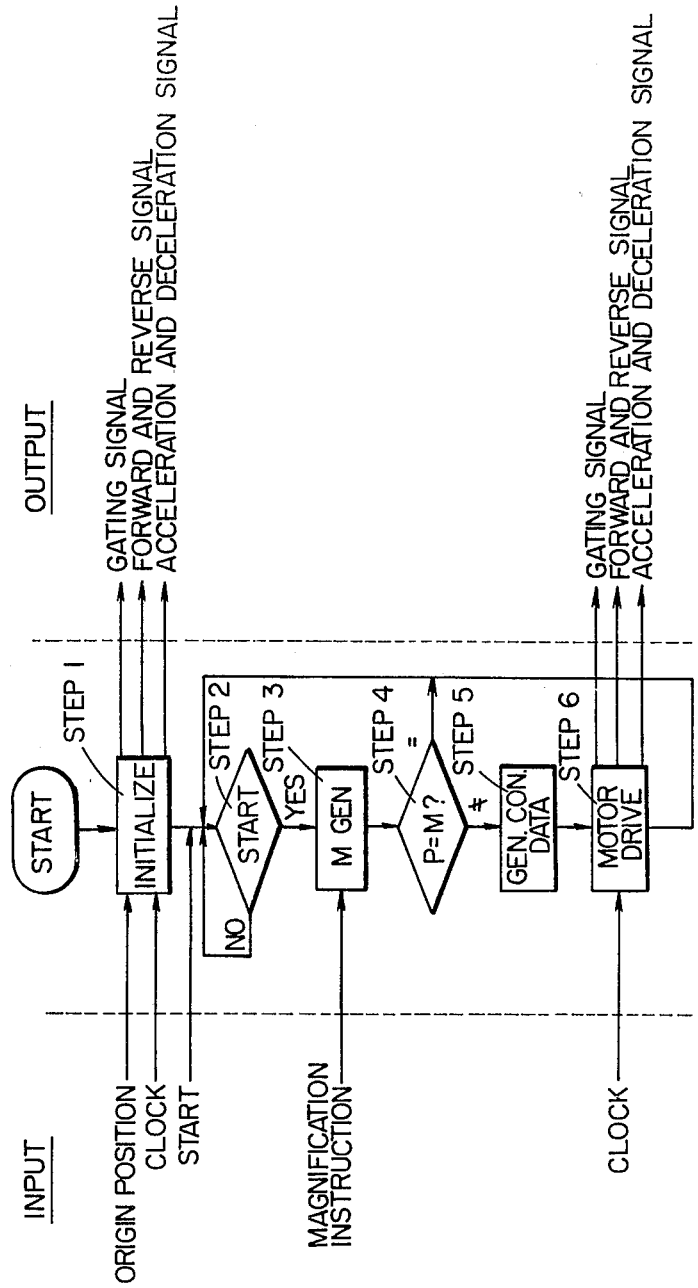
FIG. 2 is a flow chart for a description of the operation of the control circuit according to the invention.
Figure 3:
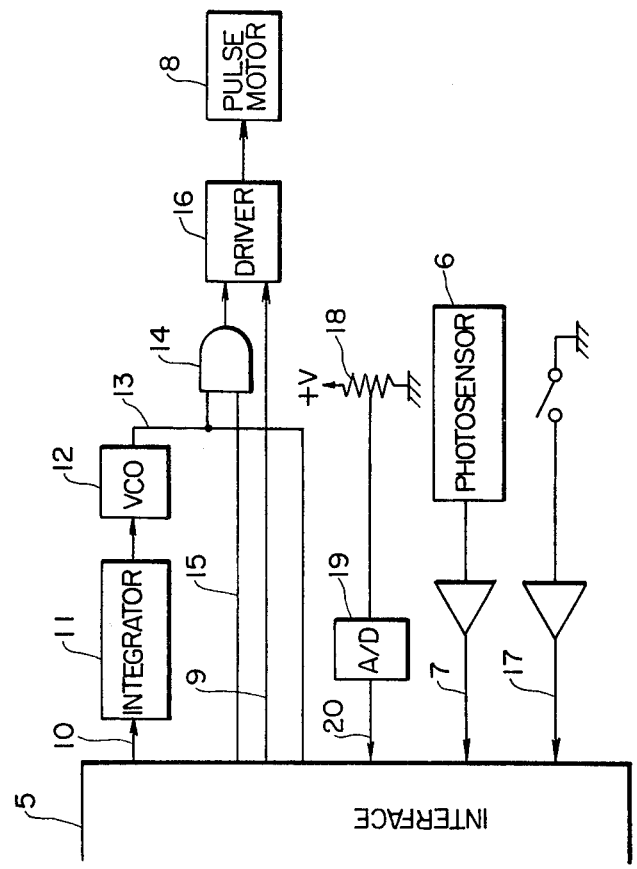
FIG. 3 is a block diagram showing external devices coupled to the control circuit of FIG. 1.

FIG. 2 shows a zooming device process flow chart describing the operation of the central processing unit in accordance with the invention. In FIG. 2, the central part shows the flow of operations of the central processing unit 1, the left part shows signals which are applied from the external devices through the interface circuit 5 to the central processing unit, and the right part shows signals which are applied from the central processing unit through the interface circuit 5 to the external devices. FIG. 3 is a block diagram showing the circuits of the external devices.

In Step 1, an origin movement is carried out to set the overall zooming device in an initial state. By this origin movement, the zooming device is synchronized with the central processing unit. The origin position of the zooming device is near the center thereof. A half of the zooming device, on one side of the origin position, is provided with a shielding plate adapted to shield a photosensor 6. The edge of the shielding plate corresponds to the origin.

In response to an origin position signal 7, the central processing unit 1 determines a direction of rotation of a pulse motor 8 to supply a forward/reverse rotation signal 9. During Step 1, an acceleration/deceleration signal 10 is maintained in an "off" state. Therefore, an integrator 11 controlled by the signal 10 is maintained disabled, and the output frequency of a voltage-controlled oscillator 12 is held constant. The output clock pulse signal 13 from the oscillator 12 is applied to an AND gate 14 and the interface circuit 5. When a gating signal 15 is provided to operate the pulse motor 8, the AND gate 14 is opened (ON), as a result of which the clock pulse signal 13 is applied to a pulse motor driver 16. In order to stop the pulse motor 8 at the edge of the origin position signal 7, the gating signal 15 is turned off. As a result, the AND gate 14 is closed so that the pulse motor 8 is stopped.

In Step 2, it is determined whether or not a pulse of a start signal 17 is present. When a pulse of the start signal 17 is detected, the operation advances to Step 3, and if not, the operation in Step 2 is carried out again.

In Step 3, the output of a potentiometer 18 is converted into a digital value by an analog-to-digital converter 19 and the digital value supplied as magnification specifying signal 20. That is, a magnification value is set by the potentiometer 18.

In Step 4, a present zoom position P stored in the RAM 3 (hereinafter referred to as "a present value") is compared with a magnification indicating value M (hereinafter referred to as "an indication value") which is inputted in Step 3. If the present value is equal to the indicating value, the operation is returned to Step 2, and if not, the operation is advanced to Step 5.

In Step 5, with the above-described present value and indication value as indices, two (a present value and a indication value) of the data values stored in the ROM 2 are read out. The difference between the contents of the two data values thus read out is the number of pulses required to move the pulse motor 8 (hereinafter referred to as "the movement pulse number"). Then, a forward-/reverse rotation signal 9 defined by the difference between the contents of the above-described two data values is produced, and an acceleration/deceleraton signal 10, which is defined by the movement pulse number, is also formed. The decision as to whether the signal 10 should be turned on or turned off is made according to the movement pulse member. For this purpose, a set value M is provided. When the movement pulse number is larger than the set value, the signal 10 is turned on, and when smaller, the signal 10 is turned off. As an example, in the case of the zooming device described above, M=600.

In Step 6, the pulse motor 8 is controlled according to the data value provided in Step 5. In order to accelerate the pulse motor 8, the forward/reverse rotation signal 9 and the acceleration/deceleration signal 10 are outputted to turn on the gating signal 15. When the signal 10 is outputted, the integrator 11 is operated and the number of pulses of the clock pulse signal 13 is increased according to the output of the integrator 11. As a result, the speed of the pulse motor 8 is increased as it rotates.

A down counter is provided in the program which is implemented such that whenever a pulse of the clock pulse signal 13 is applied thereto, the movement pulse number is subjected to subtraction. When the content of the down counter reaches a set value N (N=600 for example), the acceleration/deceleration signal 10 is turned off. As a result, the pulse motor 8 is decelerated. When the content of the down counter reaches zero, the gating signal 15 is turned off. As a result, the application of the clock pulse signal 13 to the pulse motor driver 16 is suspended and hence the pulse motor 8 is stopped. That is, the pulse motor 8 is stopped at the specified magnification position. When acceleration or deceleration is not being carried out (i.e. during constant speed operations), the acceleration/deceleration signal is maintained off while the operations of the other processing circuits are the same as those described above.

As is apparent from the above description, the magnification position of the zoom lens assembly is controlled in accordance with a computer program. Therefore, the control circuit of the invention is much simpler in arrangement than a conventional zooming device control circuit which is made up of discrete logic circuits. Moreover, addition or change of the functions (for instance, increasing the number of magnification positions or changing the acceleration or deceleration point) can be readily achieved. Furthermore, various advantageous effects such as a reduction of the number manufacturing steps needed and an improved reliability are provided by the invention.

What is claimed is:

1. A control circuit for a zooming device, comprising:
a microcomputer;
memory means coupled to said microcomputer for storing predetermined program steps;
an interface device coupled to said microcomputer;
a zooming operating circuit coupled to said interface device, said interface device operatively coupling an operating circuit to said microcomputer, said operating circuit comprising an integrator, an input of which is coupled to an acceleration/deceleration signal output of said interface device; a voltage controlled oscillator having a frequency-determining input coupled to an output of said integrator, an output of said voltage controlled oscillator forming a clock pulse signal which is coupled through said interface device to said microcomputer; an AND gate having a first input coupled to said output of said voltage controlled oscillator and a second input receiving a gating signal from said interface device; a driver having a direction input coupled to a forward/backward rotation signal from said interface device and a clock input coupled to an output of said AND gate; a pulse motor operated in response to an output of said driver; a potentiometer for setting a magnification specifying signal coupled to said interface device; a photosensor for determining a position of said zooming device for producing an origin position signal coupled to said interface device; and a start switch for producing a start signal coupled to said interface device;
wherein, said predetermined program steps include steps of setting said zooming device in an initial state; sensing the presence of said start signal; after said start signal is sensed, reading said magnification specifying signal; comparing said magnification specifying signal with a present zoom position; determining a movement pulse number in accordance with a difference between said magnification indication value and said present value; determining a state of said forward/backward rotation signal in accordance with said difference; determining a state of said acceleration/deceleration signal in accordance with said movement pulse number; supplying said acceleration/deceleration signal, said forward/backward rotation signal and said gating signal to said interface; counting the number of pulses on said output of said voltage controlled oscillator; terminating said gating signal once a counted number of said pulses corresponds to said movement pulse number.

2. The circuit of claim 1 wherein said program step of determining said state of said acceleration/deceleration signal comprises comparing said movement pulse number with a predetermined set value and setting said acceleration/deceleration signal to an active state when said movement pulse number is larger than said predetermined set value and to an inactive state when said movement pulse number is smaller than said predetermined set value.

3. The circuit of claim 1 wherein said program step of counting said pulses comprises presetting a counter with said movement pulse number and decrementing a count value of said counter by one for each said pulse.

4. A method for controlling a zooming device comprising:
(a) setting said zooming device in an initial state;
(b) generating a selected magnification signal corresponding to a selected magnification;
(c) generating zoom lens assembly position signal;
(d) determining a direction of rotation of a pulse motor to move a zoom lens assembly to said selected magnification position;
(e) determining a first number of magnification positions through which said zoom lens assembly must be moved to reach said selected magnification position, said first number being determined in accordance with said signal and said selected manification signal;
(f) determining a state of acceleration or deceleration of said pulse motor by comparing said first number and a predetermined reference number of magnification positions, said acceleration state being determined when said first number exceeds said predetermined reference number and said deceleration state being determined when said first number falls below said predetermined reference number;

(g) determining whether said zoom lens assembly has reached a selected magnification position;

(h) driving said pulse motor to move said lens assembly to a selected magnification position according to determinations made in steps (d), (f) and (g); and (i) stopping said pulse motor when said zoom lens assembly reaches a selected magnification position.

* * * * *